US006912275B1

(12) United States Patent
Kaplan

(10) Patent No.: US 6,912,275 B1
(45) Date of Patent: Jun. 28, 2005

(54) SECURE REMOTE ACCESS TO VOICE MAIL

(75) Inventor: Alan Edward Kaplan, Morris Township, Morris County, NJ (US)

(73) Assignee: AT&T Corp, New York, NY (US)

( * ) Notice: Subject to any disclaimer, the term of this patent is extended or adjusted under 35 U.S.C. 154(b) by 170 days.

(21) Appl. No.: 09/899,625

(22) Filed: Jul. 5, 2001

(51) Int. Cl.[7] ......................... H04M 1/64; H04L 380/09

(52) U.S. Cl. .................. 379/88.2; 379/67.1; 379/88.17; 379/88.18; 379/88.22; 379/88.25; 379/88.26

(58) Field of Search .............................. 379/67.1, 88.2, 379/88.17, 88.18, 88.25, 442, 68, 88.02, 88.07, 88.08, 88.1, 88.14, 88.16, 88.19, 88.21, 88.22; 380/243, 257

(56) References Cited

U.S. PATENT DOCUMENTS 5,051,720 A * 9/1991 Kittirutsunetorn ..... 340/310.02
5,392,357 A * 2/1995 Bulfer et al. ................. 380/33
5,434,920 A * 7/1995 Cox et al. ................... 380/257
5,455,861 A * 10/1995 Faucher et al. ............. 380/266
5,594,798 A * 1/1997 Cox et al. ................... 380/257
5,710,816 A * 1/1998 Stork et al. ................... 380/21
5,974,142 A * 10/1999 Heer et al. .................. 379/442
6,065,120 A * 5/2000 Laursen et al. ............. 713/201
6,073,118 A * 6/2000 Gormish et al. .............. 705/39

OTHER PUBLICATIONS

Newton's Telecom Dictionary, Definition of 'Circuit', p. 179.*

* cited by examiner

*Primary Examiner*—Allan Hoosain
(74) *Attorney, Agent, or Firm*—Henry T. Brendzel

(57) ABSTRACT

A coupler includes an analog port for interfacing with a telephone answering system a network port that is adapted for connection to an insecure network. The security problem associated with eavesdropping over insecure network is overcome by encrypting the messages that exit through the coupler's network port. In one embodiment, the coupler and the telephone answering system are distinct hardware elements and the coupler is connected to the TAD. In another embodiment, a single processor and associated memory perform the functions of the coupler's controller and of the telephone answering system, thus forming a single device that has an analog port for connecting to the public switched telephone network, as well as a port for connection to the insecure network. In yet another embodiment, the coupler/TAD combination includes a control port to allow connection to the control port of an ISDN telephone.

37 Claims, 7 Drawing Sheets

TAD
42
43
11
MEM
INTERFACE
41
μP
PSTN
100
CO
12
10
26
20
21
INTERFACE
25
CONTROLLER
22
ENRCYPT/DECRYPT
24
23
INTERFACE
MEMORY
27
201
30
202
33
INTERFACE
NETWORK 200
14
32
ENRCYPT/DECRYPT
CONTROLLER
40
31
USER DEVICE
INTERFACE

UPDATE
109
INPUT
N
Y
101
PORT 27
INPUT SOURCE
PORT 26
102
110
ENCRYPT
COLLECT PAYLOAD
103
DECRYPT
104
FORMAT, PACKAGE & OUTPUT
111
BRANCH CONTROL
105
START RINGING
106
ERROR HANDLING
114
OTHER APPS
112
OFF HOOK
107
N
Y
RELAY CODE
113
STOP RINGING
108

10
PSTN
100
CO
CO
TAD
42
MEM
43
INTERFACE
11
12
41
μP
65
60
70
H
71
μP
72
20-A
25
22
ENRCYPT/DECRYPT
CONTROLLER
23
24
INTERFACE
MEMORY
27
201
30
33
INTERFACE
201
NETWORK 200
32
ENRCYPT/DECRYPT
14
CONTROLLER
40
31
USER DEVICE
INTERFACE

SECURE REMOTE ACCESS TO VOICE MAIL

BACKGROUND

This invention relates to telephone answering systems, such as telephone answering machines and voice mail platforms.

Telephone answering machines and voicemail platforms provide a very useful service. In the case of a telephone answering machine, a caller can leave when the called party is not present. The called party typically retrieves messages by interacting with the physical user-interface of the answering machine itself. In the case of voice mail platforms, it allows a caller to leave a message when the called party is busy with another call as well as when the called party is not present. The called party typically retrieves the messages via the telephone instrument that is associated with the telephone number dialed by the party that left the message.

At times, it is desirable to retrieve messages from some other location. Recognizing this fact, the voicemail platform permits a user to call the platform from anywhere, identify the voicemail box (which is the number called by the party that left the message) enter a password, and retrieve the messages. Similarly, most telephone answering machines are adapted to accept a triggering code from a remote device, which diverts the telephone answering machine from a message-taking mode to a message-retrieval mode. Alas, the above-described approach to remote message retrieval is machines, or in connection with accounts on a voicemail platform, are typically quite short (perhaps two to six digits long) and, therefore, it takes an interloper a relatively short time to overcome this security hurtle.

A more severe problem exists when the voice mail is played out over an insecure data network (e.g., the Internet) or, worse yet, over wireless link, since an interloper can simply eavesdrop on the passing information.

SUMMARY OF THE INVENTION

The problems of the prior art are overcome, and a technological advance is achieved with a coupler that includes an analog port for interfacing with a telephone answering system or with a voicemail platform within a first network, such as the public switched telephone network (PSTN), and additionally includes a network port that is adapted for connection to an insecure network. The security problem associated with the relatively short triggering code is overcome with a one-time password authentication process, while the security problem associated with eavesdropping over insecure network is overcome by encrypting the messages that exit through the network port. In one embodiment, the coupler and the telephone answering system, for example a telephone-answering device (TAD), are distinct hardware elements and the coupler is connected to the TAD. In another embodiment, a single processor and associated memory perform the functions of the coupler's controller and of the telephone answering system, thus forming a single device that has an analog port for connecting to the public switched telephone network, as well as a port for connection to the insecure network. In yet another embodiment, the coupler/TAD combination includes a control port to allow connection to the control port of an ISDN telephone. In still other embodiments, public key encryption is employed, particularly in connection with voicemail platforms.

DETAILED DESCRIPTION

Figure 1:
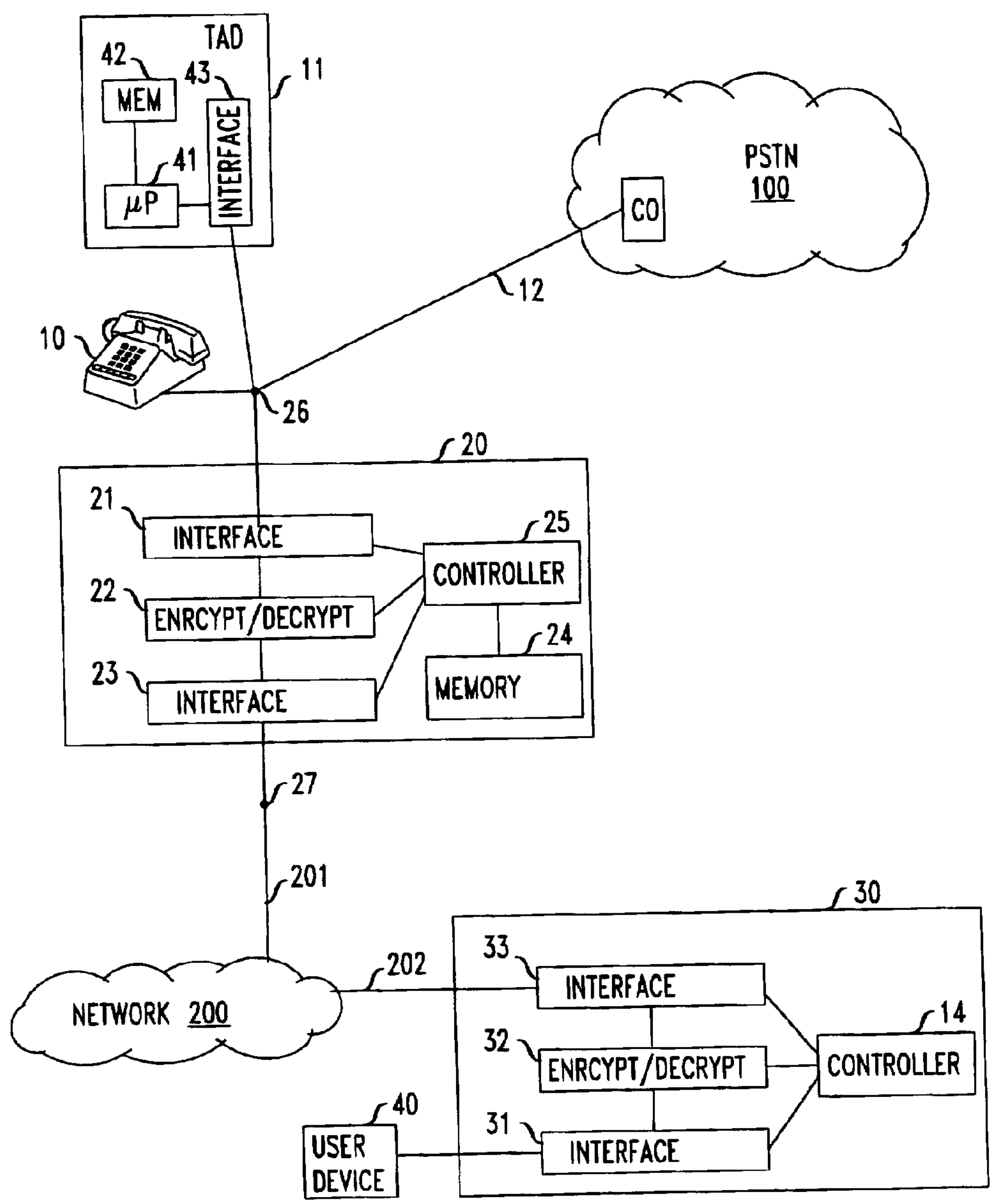
FIG. 1 depicts a block diagram of one embodiment that incorporates the principles of this disclosure.

FIG. 1 presents a block diagram of one embodiment in conformance with the principles disclosed herein. It includes a telephone 10 that is connected to PSTN 100 through line 12, and a TAD 11 that is also connected to line 12; i.e., in parallel with telephone 10. The FIG. 1 embodiment also includes a home coupler 20 that includes a controller 25, a line interface circuit 21 an encryption/decryption module 22 and an output interface module 23. Elements 21, 22 and 23 are connected to controller 25. Additionally, circuit 21 is connected to line 12 and to module 22, and output interface module 23 is connected to module 22 and to network 200. Through network 200, coupler 20 can be connected to coupler 30.

FIG. 1 shows a connection between elements 21 and 22 and between elements 23 and 22, which allows the flow of signals between interface circuit 21 to interface circuit 23, via encryption/decryption module 22. A designer may choose to allow those signals to flow through controller 25, and such a choice would obviate the need for a direct connection between elements 21 and 22, and elements 23 and 22. Controller 25 comprises a processor that is connected to an associated memory 24. The memory stores at least the programs that controller 25 requires.

Interface circuit 21 interfaces with TAD 11 under direction of controller 25; for example, to retrieve messages from TAD 11. Conventional telephone answering devices are adapted to output stored messages in response to a ringing signal (that activates the answering device) followed by a DTMF triggering code that enables retrieval of messages, and followed still by DTMF codes that control the message retrieval process. Accordingly, for applications where TAD 11 is a conventional telephone answering device, module 21 includes D/A circuitry for generating a ringing signal, for generating the above-mentioned DTMF codes, and for converting digitized messages from network 200 to analog form; all under direction of controller 25. It also includes A/D circuitry for receiving voice messages from TAD 11, converting the voice signal to digital form, and supplying the digitized voice to encryption/decryption module 22, directly or via controller 25.

Encryption/decryption module 22, which encrypts or decrypts signals based on controller 25 directions, may be a physical circuit that is distinct from controller 25, or a subroutine that is executed by the processor of controller 25. As a physical circuit that is distinct from controller 25, module 22 can be subsumed by circuit 23.

The specifics of output interface circuit 23 depend on the nature of the signals that flow through communication channel 201. For example, when channel 201 carries analog signals to an analog network, interface circuit 23 includes circuitry for converting the encrypted digital signal to analog format. Such circuitry may simply be the circuitry that comprises conventional modems for transmitting digital signals over an analog line (constellation symbols that modulate an analog carrier). When line 201 is connected to a digital network, for example the Internet, circuitry 23 includes means for communicating in IP (internet protocol) packets. The means for communicating in IP protocol can include appropriate software modules of a conventional Internet browser.

Put in general terms, interface circuitry 23 conditions signals by "packaging" the encrypted digital signal stream in accordance with some chosen schema, and formating the signal into a form that is acceptable to channel 201. For the reverse path, interface circuit 23 un-formats signals received from network 200, and "up-packages" them to obtain a digital signal stream. In short, interface circuits 21 and 23 typically comprise hardware, and software that is executed by controller 25.

One object of this invention is to provide security for information that flows through network 200 and, therefore, while this invention is useful even when network 200 is a line-switching network, for example, a network that subsumes PSTN network 100, it is expected that this invention will find particular use when network 200 is less secure, such as a network that is, or includes, a packet-switching network, or a wireless network. Accordingly, it should be understood that the communication channel depicted by line 202 is a wired, or a wireless, communication channel, and that network 200 can comprise wireless, packet switching, or other insecure portions.

Coupler 30, which interacts with coupler 20 via network 200, may be an element that includes circuits that are physically connected to a user device to provide connectivity between network 200 and device 40. For example, device 40 may be a conventional telephone, and communication channel 202 may be a wired connection to network 200. For such an application, coupler 30 includes an interface circuit 33 that receives a signal over channel 202, un-formats it in accordance with the chosen schema employed within interface circuitry 23, and thereafter, "un-packages" the signal to result in a digital stream. The digital stream is applied to encryption/decryption circuit 32. Circuit 32 decrypts the signal to obtain a digitized voice signal, and applies the digitized voice signal to interface circuit 31. Circuit 31 converts the digital signal to analog form and applies the analog signal to user device 40, which, in this example, is a conventional telephone. For signals flowing in the opposite direction, interface circuit 31 converts analog signals to digital form, module 32 encrypts the digital signal, and interface circuit 33 "packages" it, formats it, and applies it to channel 202. In the course of applying a voice signal to channel 202, circuit 32 includes a buffer for a short segment of the voice signal to account for the non-uniform transmission that occurs over network 200.

Elements 33, 32, and 31 operate under direction of controller 14 that includes a processor and associated memory. As with coupler 20, software modules within controller 14 can carry out some of the functions of interface circuits 31 and 33, as well as the function of module 32. It may be noted that coupler 30 can be easily incorporated into device 40, particularly when device 40 is implemented with an interface module that interacts with a processor operating under stored program control.

While the above example speaks of a telephone and a wired connection to network 200, it should be noted the same principles apply to wireless connections, and to other types of user devices, such as computer, digital telephones, wireless telephones, PDAs etc.

Figure 2:
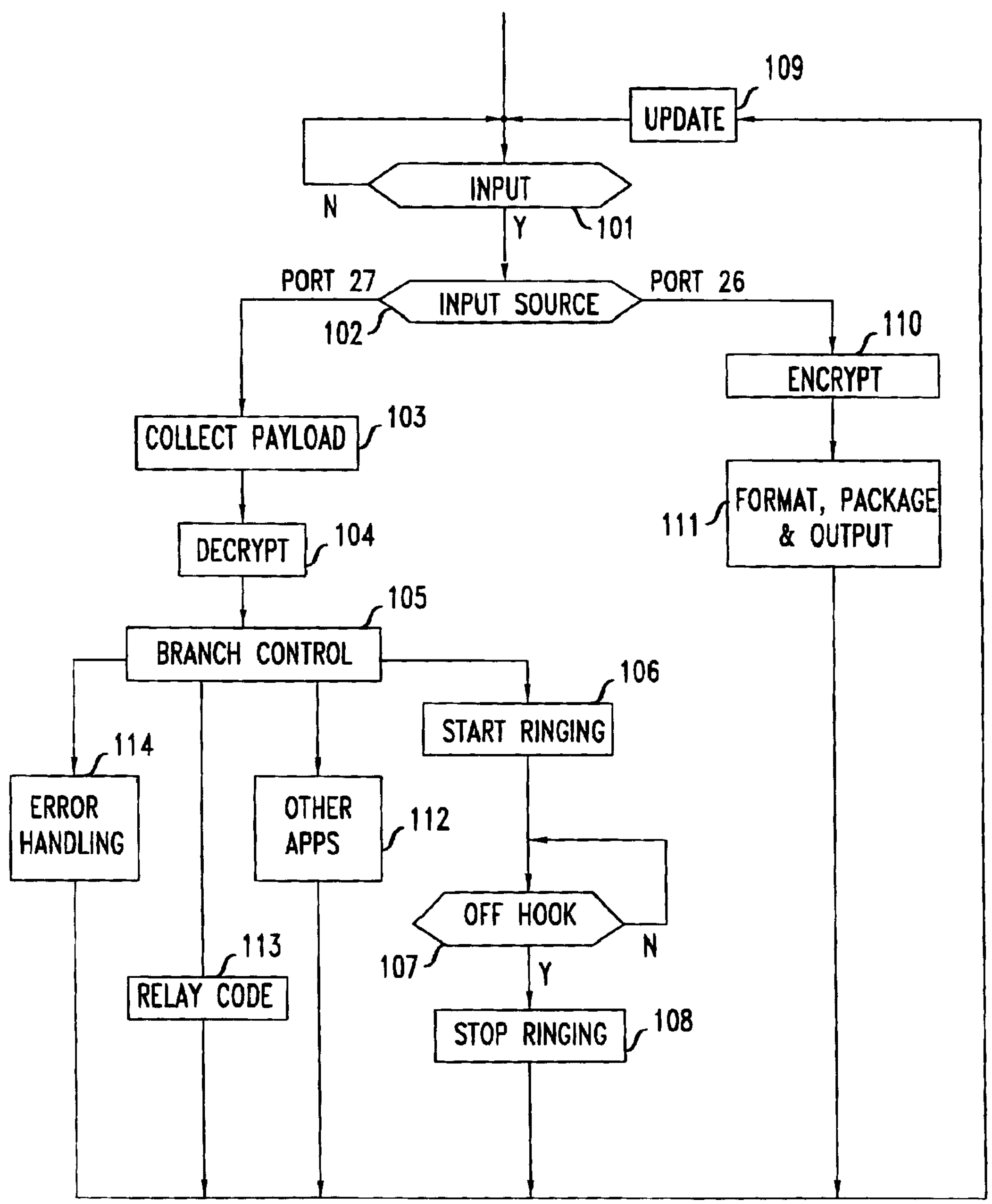
FIG. 2 presents a flowchart for operating the FIG. 1 arrangement.

FIG. 2 is a flowchart of a process carried out in coupler 20, by which user device 10 can retrieve messages from TAD 11. For purposes of the FIG. 2 process, it is assumed that network 200 is a packet network; or more precisely, that the information passing through channels 201 and 202 is in packets, and the "payloads" of a number of packets need to be combined in order to construct a complete message that arrives from user device 40. Conversely, a message that is destined to user device 40 needs to be divided into payload segments that are loaded into a sequence of packets.

Thus, the first step in the FIG. 2 process, step 101, waits for an input signal from either port 26, or port 27 of coupler 20. Upon the arrival of such a signal, control passes to step 102, which routes the input signal to step 103 when the input is a packet from port 27, and to step 120 when the input signal is from port 26 (sampled and digitized by interface circuit 21). When the signal is from port 27, step 103 strips the payload of the incoming packet and concatenates it to a message string that is maintained within memory 24; When controller 25 determines that a completed message has been accumulated, the message is forwarded to step 104, where the message is decrypted and forwarded to branching step 105. Step 105 analyzes the message and routes it accordingly, taking account of the state of TAD 11 as it is known to controller 25 and stored in memory 24. Controller 25 includes a conventional module for identifying DTMF codes imbedded in the message arriving at port 27. This module can be implemented, for example, with subroutines that implement narrow filters that are tuned to the tones used by DTMF dialing pads.

In its dormant state, TAD 11 is ready to be accessed for storing of a message or for retrieving messages. More specifically, in this readiness state TAD 11 awaits the arrival of a preselected number of ringing signal bursts. Therefore, when the decrypted message that is routed to branching step 105 specifies a bona fide access from network 200, control passes to step 106, which starts sending a ringing signal to port 26 and passes control to step 107. TAD 11 switches from a dormant state to an active state (an "off-hook" state) after the above-mentioned preselected number of ringing signal bursts. When TAD 11 is in its active state, it is ready to receive and record a message, or to respond to control signals (such as the triggering code for retrieving messages). Step 107 cycles on itself until it detects that TAD 11 went off hook. As such time, control passes to step 108, which stops the ringing signal and passes control to step 109. The latter updates the state of TAD 11 as it is perceived by controller 25, and passes control back to step 101.

A TAD that goes off hook in response to ringing signals normally outputs a greeting message. The greeting message signal is detected by step 101, and step 102 passes the digitized signal developed by interface circuit 21 to step 110, which encrypts the digitized signal and passes it to step 111. Step 111 formats and packages the signal in accordance with the requirements of channel 201, outputs the resulting signal to port 27, and returns control to update step 109.

The greeting of TAD 11 typically invites one to leave a message and generally does not reveal that TAD 11 stands ready to receive control signals in the form of DTMF codes, and that one such code signal (typically a sequence of a number of DTMF signals) is a triggering code for retrieval of messages. When a control code is not provided, TAD 11 assumes that whatever signals are provided need to be stored as a message to be retrieved later. For such an input, the FIG. 2 process includes step 112, which encompasses the leave-a-message application of coupler 20. When the user of device 40 responds with DTMF signals, control passes to step 113, which simply relays the code to port 26. This allows the user to interact with TAD 11 for the purpose of retrieving messages and also for administrative control of TAD 11, control of other actions by TAD 11, and administrative control of coupler 20. By administrative control of coupler 20 is meant that some control signals, which may or may not be mimicked to TAD 11, are used by coupler 20 to alter its own operational parameters. When coupler 20 receives the message retrieval code and step 113 relays that code to TAD 11, the TAD typically outputs another voice message, and that message is relayed to the user of device 40, in the manner described above.

In this way, communication is established between TAD 11 and the user of device 40, allowing the user to retrieve the messages stored in TAD 11. Encryption/decryption module 22 insures that no one can control TAD 11 via link 201 except for the user that has coupler 30, and no one other than that user can understand the messages that are sent, or received, by coupler 20 over port 27. Thus, communication with coupler 20 over network 200 is secure. When an interloper does attempt to gain access to coupler 20, step 105 ascertains that no valid branch route has been reached. In such a case, control passes to error handling step 114. The processing in this step can be whatever a designer wishes to effect. One example might be to simply reset the state information that controller 25 maintains in memory 24. Another might be to shut down coupler 20 for an extended period of time after a preselected number of accesses to step 114 occur within a specified time interval.

The arrangement shown in FIG. 1 has the advantage that a coupler 20 can be purchased separately, and connected in parallel to a conventional TAD. A slight problem exists with this arrangement however, in that a ringing signal that is applied to TAD 11 is also applied to telephone 10. If a person is present at the location of telephone 10 when telephone 10 responds to this ringing signal, chances are that this person would pick up telephone 10 and, consequently, coupler 20 would cease ringing, and TAD 11 would not receive the requisite number of ringing signal bursts for it to go into its active state.

Figure 3:
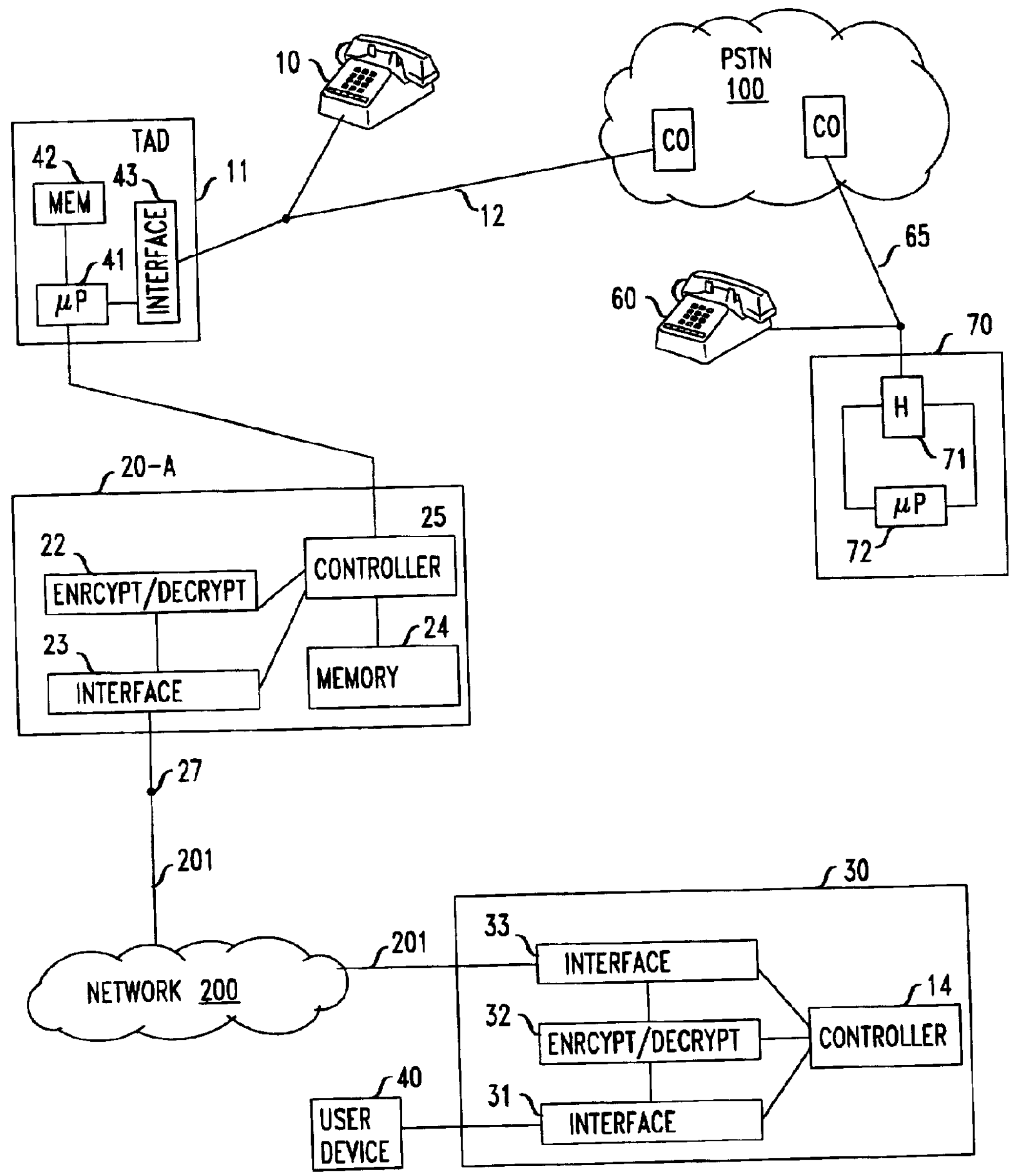
FIG. 3 is a block diagram of an arrangement that is similar to the FIG. 1 arrangement, except that coupler 20-A employs a digital connection to a processor within the arrangement's TAD.
Figure 4:
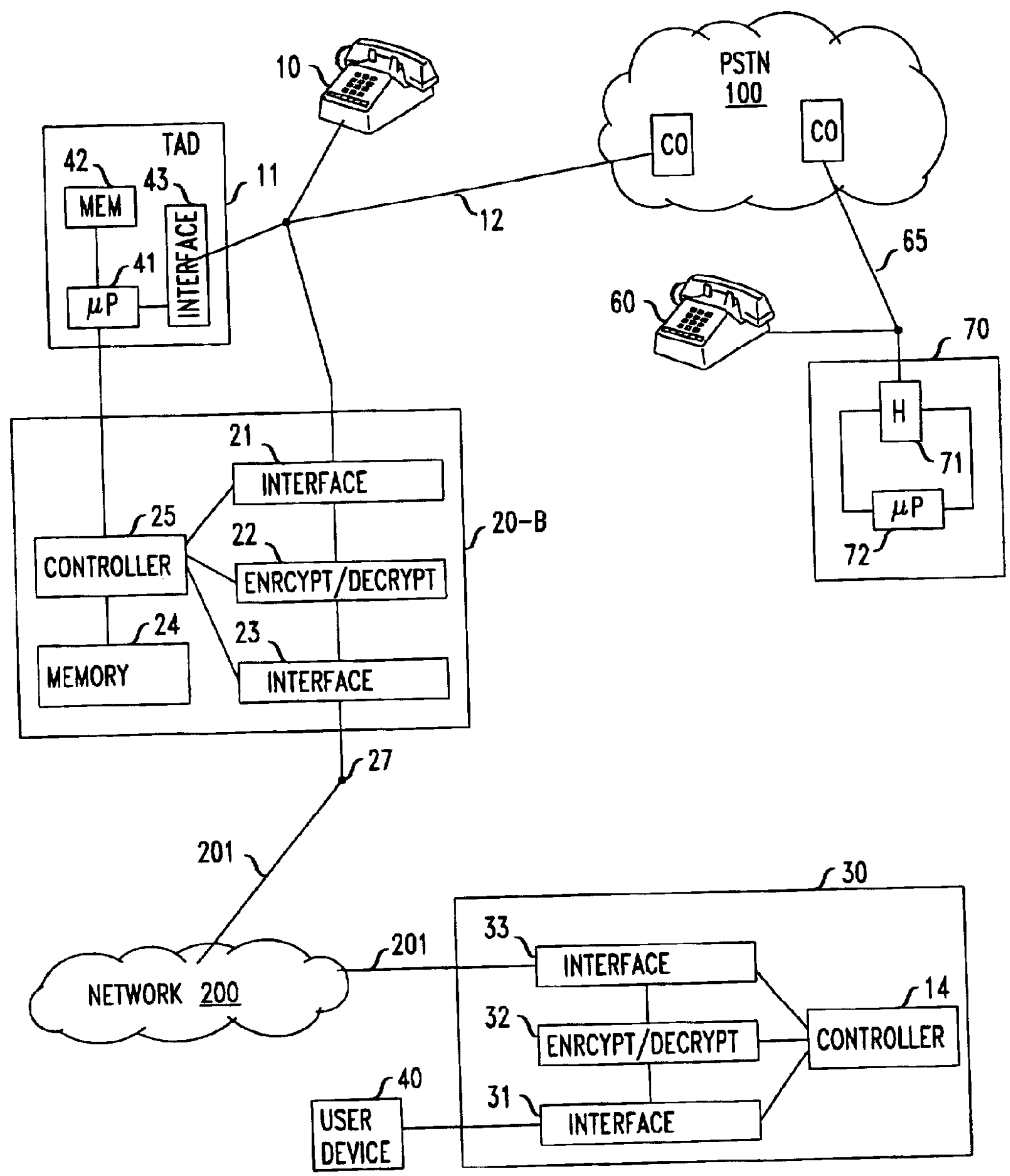
FIG. 4 is a block diagram of an arrangement that is similar to the FIG. 1 arrangement, except that coupler 20-C includes two connections to the TAD, with one being a digital connection to a processor within the arrangement's TAD.

This slight problem can be overcome for most designs of today's telephone answering machines quite simply, because these designs employ a microprocessor, associated memory, and an interface circuit that couples the microprocessor to the output port, or ports, of the TAD. This is illustrated by blocks 41, 42 and 43, respectively, in FIG. 1. Specifically, the above-mentioned slight problem can be overcome by having controller 25 communicate directly with microprocessor 41, as shown in FIG. 3. In applications where a connection between microprocessor 41 and controller 25 can service all communications needs, including the voice greetings, directions, and retrieved messages from TAD 11, as well as all control (and possibly message) communications from coupler 20-A, then interface circuit 21 can be dispensed with altogether, as is the case in the FIG. 3 depiction. Other than dispensing with interface circuit 21 and having controller 25 communicate directly with microprocessor 41, coupler 20-A is identical to coupler 20. Of course, in applications where the connection between controller 25 and microprocessor 41 cannot service all communication needs, interface 21 remains, and the arrangement is as shown in FIG. 4, with the only difference being that coupler 20-B includes a connection from controller 25 to the digital port of TAD 11, and interface circuit 21 has a connection to the analog port of TAD 11. In both FIG. 3 and FIG. 4, the ringing signals are to TAD 11 through its digital port, directly to microprocessor 41. Since no ringing thus occurs at telephone 10 it becomes irrelevant whether telephone 10 is taken off hook when a ringing signal is applied by coupler 20.

Figure 5:
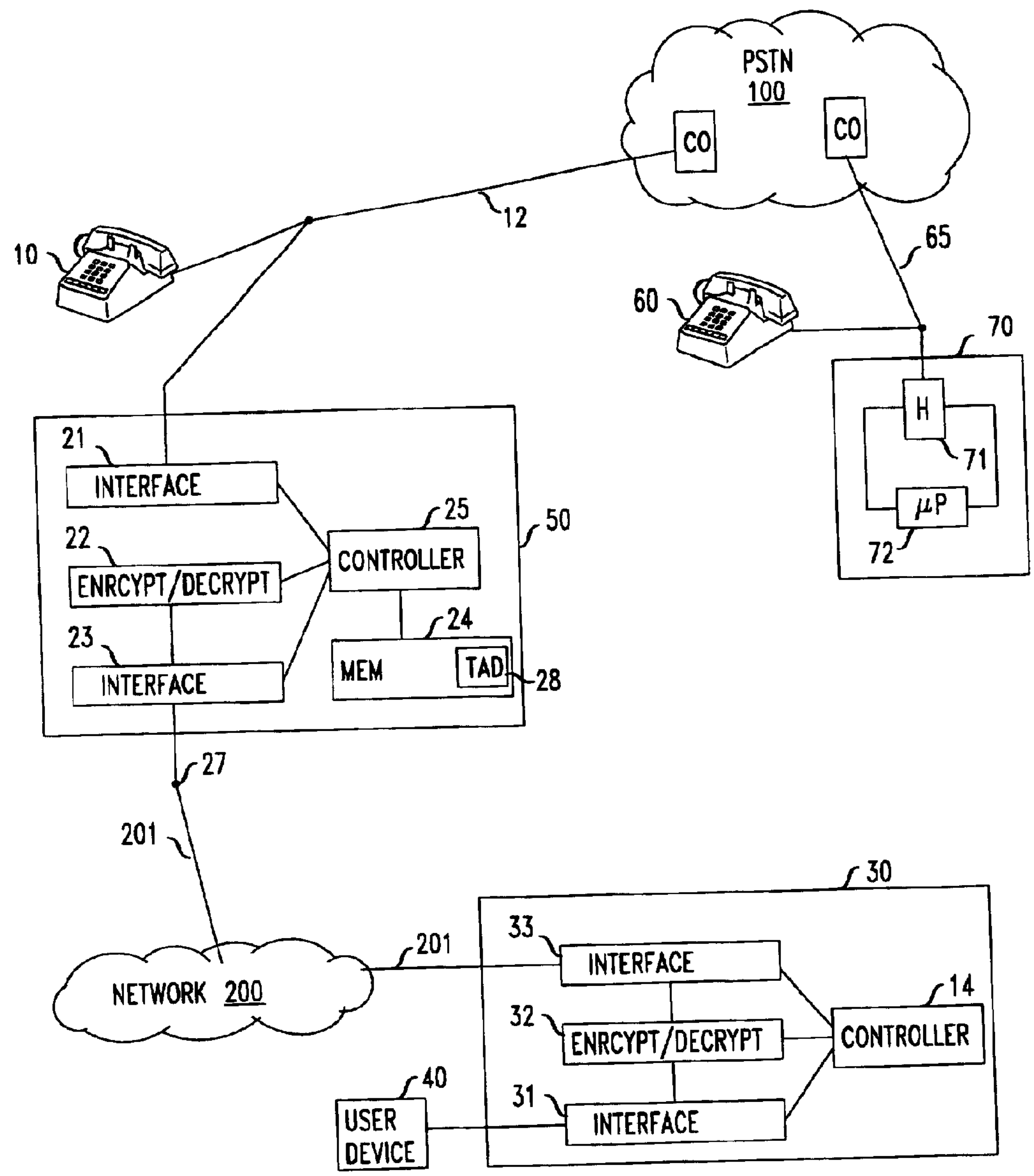
FIG. 5 combines the functions of coupler 20 and TAD 11 into a single device 50.

A perusal of the FIGS. 3 and 4 arrangements reveals that, advantageously, microprocessor 41 and all its associated software in memory 42 can be combined with controller 25 and memory 24, yielding an arrangement as depicted by coupler/TAD 50 in FIG. 5, which serves the functions of coupler 20 and TAD 11. The function of TAD 11 is realized by means of interface circuit 21, controller 25, and a conventional TAD software package 28 in memory 24. In addition to the apparent advantages that are associated with combining the functions of TAD 11 and coupler 20 into a single device 50, the FIG. 5 arrangement also has an advantage relative to security of accessing stored messages over channel 12. As indicated above, conventional telephone answering machines allow users to access and retrieve messages via channel 12 by supplying the fairly short message-retrieval triggering code that is easily discoverable.

In accordance with one aspect of the FIG. 5 systems, a much longer password is employed and, moreover, the password is always different and practically never repeating. This requires, however, that a user, for example, at telephone 60, have a "crypto-box" 70 that is coupled to central office line 65 of telephone 60. The coupling can be electrical, through the ear piece and the mouth piece of telephone 60, or manual. That is, the user hears numbers, enters those numbers into box 70, box 70 outputs a corresponding set of digits, and the user enters those digits via the keypad. To provide a convenient means for establishing an electrical connection, box 70 may be constructed with two conventional telephone jacks, to allow for simple parallel connection of telephone 60 and box 70 to line 65. Crypto-box 70 that is adapted for electrical connection includes a conventional hybrid 71 that extracts the signals arriving from line 65 and applies them to microprocessor 72 (with its associated memory that is not shown). Processor 72 decodes DTMF signals into their corresponding digits, encrypts the incoming digits with the use of a secret kernel that is known only to microprocessor 72 and controller 25, and outputs the encrypted result to hybrid 71 for transmission back to coupler/TAD 50.

Figure 6:
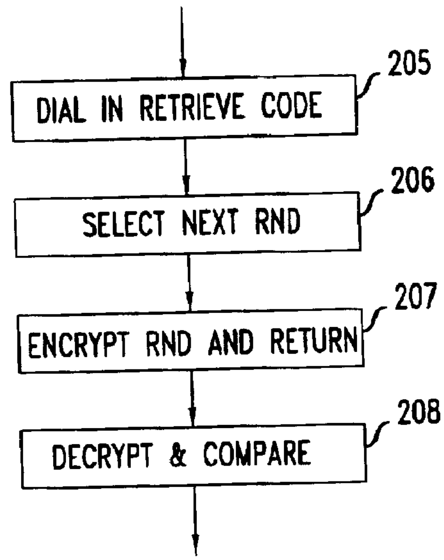
FIG. 6 presents a flow diagram depicted the use of a single-use password over channel 12 of the FIG. 4 arrangement.

FIG. 6 presents a block diagram of a process for authenticating a user with crypto-box 70. In step 205, a user at telephone 60 dials telephone 10, coupler/TAD 50 responds with a greeting, and the user sends the message retrieval triggering code. Controller 25 recognizes this code, and in step 206 controller 25 obtains a number from a random number generator (a software module executed by controller 25). Controller sends the obtained number to the user, where the number is fed to crypt-box 70. In step 207, the received number is encrypted, and the encrypted number is sent back to controller 25. In step 208 controller 25 decrypts the received encrypted number. Since controller 25 and microprocessor 72 employ an encryption/decryption schema that is designed for communication therebetween, controller 25 recovers the random number that was previously sent. If step 208 recovers the number, the log-in process is deemed to have been successfully completed and controller 25 proceeds with its normal interactions for retrieving messages. At this time, controller 25 also records the "logged-in" state of unit 50. TAD control codes that arrive thereafter are handled normally, until unit 50 goes "on-hook," whereupon the "logged-in" state of unit 50 is replaced with a "not-logged in" state. When controller 25 does not receive the random number that has been sent, step 208 refuses to proceed with the normal interactions for retrieving messages.

Figure 7:
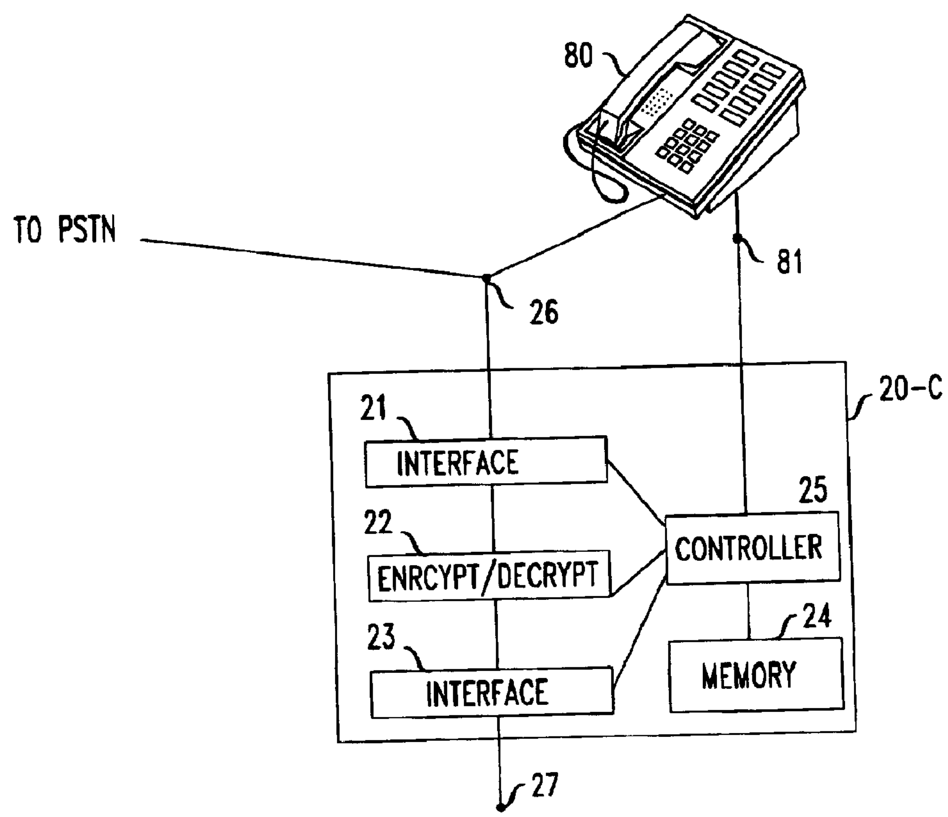
FIG. 7 shows a block diagram of an arrangement that involves a telephone that possesses a digital control port 81.

FIG. 7 presents a block diagram of an arrangement that is suitable for telephones that have a digital control port, such as ISDN phone 80. In the FIG. 7 arrangement, interface circuit 21 is coupled to the line that comes from a PBX, or a central office, and element 20-C is like element 50 in FIG. 5, in that it subsumes the TAD function, and like coupler 20-B of FIG. 4 in that controller 25 communicates with control port 81 of ISDN phone 80 while interface circuit 21 communicates with the line port of ISDN phone 80. It may be noted that interface 21 is adapted to operate with ISDN protocol signals on port 26 when telephone 80 is an ISDN phone.

The encryption and decryption schema of modules 22 and 32 may be based on a shared secret, but other approaches, such as public key encryption are also possible. One characteristic of a messaging platform is that it is located on the premises of the telecommunications service supplier, and to a significant extent it is NOT under control of the user for whom messages are left. Another characteristic of a messaging platform is that is serves many users. Primarily because of the latter characteristic, public key encryption has some attraction, because only one key is needed. Encryption and decryption with public keys is typically slower, however.

Figure 8:
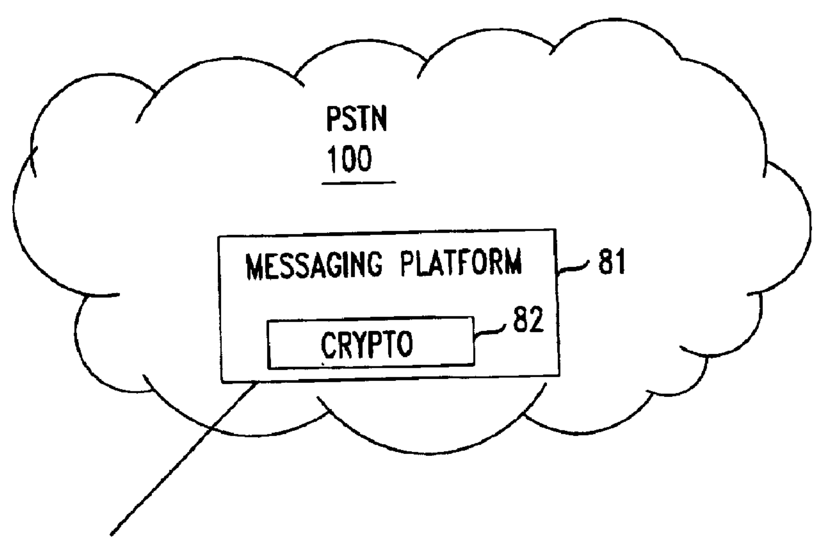
FIG. 8 shows the use of an encryption module within a voicemail platform.

FIG. 8 presents a block diagram of an arrangement involving a messaging platform 81. Basically, messaging platform 81 is within PSTN 100, and it includes an encryption/decryption "crypto-box" 82 module that employs public key encryption principles. Specifically, each user that has a "mailbox" in platform 81 generates a private key ($U_{Prv}$)-public key ($U_{Pub}$) pair, and supplies platform 81 with the public key $U_{Pub}$. Platform 81 also has a private key ($M_{Prv}$)-public key ($M_{Pub}$) pair, and it supplies all its users with the public key $M_{Pub}$. In operation, a user that wishes to retrieve messages from platform 81 dials a specified number and is connected to the platform. Typically, platform 81 outputs a greeting that requests the user to identify himself/herself with a mailbox number. In accordance with the principles disclosed herein, following the identification of the user, communication between the user and the platform proceeds in the convention way, except that it is encrypted. That is, platform 81 sends its messages to the user by encrypting those messages with the user's public key, and the user sends messages (e.g. command codes) to platform 81 by encrypting those messages with the platform's public key.

It should be realized that the above merely illustrates the principles of this invention and that various modifications and enhancement can be included without departing from the spirit and scope thereof. Indeed, some of the modifications can correspond to embodiments that are not as robust as the embodiments disclosed above. For example, if general control of coupler 20, or TAD 11 is not of interest, perhaps because neither coupler 20 nor TAD 11 offer control capabilities other than retrieval of stored messages, then the only concern is that retrieved messages that flow to user 40 over network 200 should remain private. All other communications can be in the clear. For such an embodiment, module 22 can be implemented with only an encryption capability (and no decryption capability), and module 32 can be implemented with only a decryption capability. The structure of coupler 20 can be the same as in the FIG. 1 arrangement. Alternatively, coupler 20 can be constructed to allow all voice communication from TAD 11 other than the retrieved messages; e.g., greetings and instructions, to flow to network 200 in the clear, rather than in encrypted form. In such an embodiment, the signal flow through interface circuit 21, encrypt module 22, and interface module 23 is slightly different; to wit, encryption module 22 is bypassed for all signals other than the retrieved messages themselves. Further, coupler 20 may be designed to operate in two modes: secure and insecure. The system operates normally in a secured mode, but when controller 20 determines that decrypted signals make no sense, and the un-decrypted signals correspond to a bona fide request to retrieve messages, then controller 20 switches to the insecure mode. This, of course has the disadvantage of insecure communications, but has the advantage that access to stored messages can be had in cases where the user does not possess coupler 30.

What is claimed is:

1. A coupler having a first port and a second port comprising:

- a first interface circuit connected to said first port for interacting with a telephone answering system;
- a second, digital, interface circuit connected to said second port;
- an encryption module that is interposed between said first interface circuit and said second interface circuit that encrypts voice information that is received at said first port for delivery to said second port and decrypts signals arriving from said second port for delivery to said first port; and
- a controller connected to said first interface circuit, said encryption module, and said second interface circuit, causing ringing signals to be applied by said first interface circuit to said first port in response to a verified request from said second port to gain access to information in said telephone answering system.

2. The coupler of claim 1 where said encryption module encrypts all signals set for delivery to said second port.

3. The coupler of claim 1 where said encryption module, in response to signals from said controller, encrypts some signals set for delivery to said second port, and leaves other signals set for delivery to said second port unencrypted.

4. The coupler of claim 1 where said encryption module decrypts signals arriving from said second port to form recovered signals, and said controller analyzes said recovered signals.

5. The coupler of claim 1 where said first port is an analog port adapted for connection to a telephone-answering device.

6. The coupler of claim 1 where said request to gain access is verified when a signal received at said second port and decrypted by said encryption module is recognized as an access request.

7. The coupler of claim 1 where said request to gain access is verified when a signal received at said second port includes a password that is recognized by said controller as bona fide.

8. The coupler of claim 1 where said controller causes application of DTMF codes to said first port in response to control signals arriving at said second port.

9. The coupler of claim 8 where, in response to some control signals arriving at said second port said controller modifies its operating characteristics.

10. The arrangement of claim 1 wherein said second interface circuit is adapted to send digital signals modulated onto an analog carrier to said output port, and to receive digital signals modulated onto an analog carrier from said output port.

11. The coupler of claim 1 wherein said encryption module is implemented by means of an executing program on said controller.

12. The arrangement of claim 1 where said telephone-answering system is a telephone answering device is a user's home that is coupled to said network via a second network.

13. The arrangement of claim 1 where said telephone-answering system is a voicemail platform located that stores messages for a plurality of subscribers.

14. An arrangement including a telephone answering system having an analog port, and a coupler, comprising:

a first interface circuit within said coupler connected to said analog port and to said telephone answering system;

a second interface circuit connected to an output, digital, port of said coupler;

an encryption module interposed between said first interface circuit and said second interface circuit for encrypting voice information that is received at said analog port for delivery to said output port; and a controller within said coupler for controlling said first interface circuit, said encryption module, and said second interface circuit, causing ringing signals to be applied to said telephone answering system port in response to a verified request from said second port to gain access to information in said telephone answering system.

15. The arrangement of claim 14 wherein said second interface circuit is adapted to send digital signals modulated unto an analog carrier to said output port, and to receive digital signals modulated unto an analog carrier from said output port.

16. A coupler comprising:

a first port;

a second port;

a third port;

a first interface circuit connected to said first port for interacting with a telephone answering system;

a second interface circuit connected to said second port and adaptive to receive digital signals;

an encryption module that is interposed between said first interface circuit and said second interface circuit for encrypting voice information that is received at said first port for delivery to said second port; and a controller connected to said first interface circuit, said encryption module, and said second interface circuit, and also connected to said third port, applying a ringing signal to said third port in response to a verified request arriving at said second port to gain access to information in said telephone answering system, and causing said first interface circuit to apply analog signals to said first port in response to other control signals arriving at said second port.

17. A coupler comprising:

a first port;

a second port;

a controller communicating digitally with said first port, said controller receiving a digitized voice signal from said first port and encrypting said digitized voice signal to form an encrypted voice signal; and an interface circuit interposed between said controller and said second port, for receiving said encrypted voice signal, conditioning the encrypted voice signal in accordance with a chosen schema, and applying the conditioned encrypted voice signal to said second port.

18. A telephone answering system comprising:

a first port;

an interface circuit connected to said first port and conditioned for communication with a telephone instrument connected to said first port;

a controller for interacting with said interface circuit, said controller having a memory and program modules stored in said memory, including a telephone answering program module and an encryption program module; and an interface circuit coupled to said controller, for interfacing with a second port of said telephone answering system;

where said controller interacts with said first port, under control of said telephone answering program module, via said interface circuit that is connected to said first port, to store messages within said memory, and said controller interacts with said second port to (a) receive a request to send messages stored in said memory, (b) confirm that said request is bona fide, (c) retrieve a message from said memory, (d) encrypt said message with said encryption program module to form an encrypted message, and (e) send said encrypted message to said second port.

19. The answering system of claim 18 where said request is deemed bona fide when a decryption of said request with said encryption program module yields a valid request.

20. The answering system of claim 18 where said request is deemed bona fide when it includes a valid password.

21. The system of claim 18 where said controller sends messages to said second port pursuant to a dialog of messages sent to, and received from, said second port.

22. The system of claim 18 further comprising a module that performs encryption of signals that are sent to said second port.

23. The system of claim 22 where said module that performs encryption of signals that are sent to said second port is a program module that is stored in said memory.

24. The system of claim 22 where said module that performs encryption of signals that are sent to said second port also performs decryption of signals arriving at said second port.

25. The system of claim 22 where said encryption module is a circuit that is distinct from said controller.

26. The system of claim 22 where said encryption module is a software module that is executed by said controller.

27. The system of claim 22 where said encryption module is physically part of said interface circuit.

28. The system of claim 22 wherein said encryption module decrypts signals arriving from said second port, via said second interface circuit.

29. An arrangement for retrieving messages from a telephone-answering system comprising:

a packet network, a user device, a first coupler that encrypts signals sent out by said user device to form encrypted signals and forward the encrypted signals to said network, and a second coupler for receiving said encrypted signals from said network, decrypting the encrypted signals to form recovered signals, and applying said recovered signals to said telephone-answering system, where said first coupler employs a public key of said second coupler to perform its encrypting function, and said second coupler employs a private key of said second coupler to perform its decrypting function, where said public key is known to all users that which to know the key, but said private key is known only to said second coupler.

30. The arrangement of claim 29 where said telephone-answering system is a telephone answering device is a user's home that is coupled to said network.

31. The arrangement of claim 29 where at least a portion of said network is digital or wireless.

32. A method carried out in a coupler, for accessing a telephone-answering system comprising the steps of:

receiving a digital message at a first port;

ascertaining whether said message corresponds to a bona fide access request;

when said step of ascertaining determines that said message corresponds to a bona fide access request, forwarding an alert to a second port that is conditioned to place a telephone answering system connected to said second port in a message retrieval mode;

communicating prompt messages received from said second port to said first port;

communicating response messages received from said first port;

encrypting stored messages received at said second port in response to said response messages to form encrypted messages; and communicating said encrypted messages to said first port.

33. The method of claim 32 wherein said communicating prompt messages includes encrypting said prompt messages prior to applying the encrypted prompt messages to said first port.

34. The method of claim 32 wherein said communicating response messages received from said first port includes decrypting said response messages to form decrypted response messages, prior to applying said decrypted response messages to said second port.

35. The method of claim 32 wherein said step of ascertaining whether said message corresponds to a bona fide access request comprises decrypting said message received at said first port and concluding that said message is a bona fide access request when said step of decrypting yields a preselected message.

36. The method of claim 32 wherein said step of ascertaining whether said message corresponds to a bona fide access request comprises:

identifying a user from said message;

selecting a key based on identity of said user, and decrypting said message received at said first port, with assistance of said key, and concluding that said message is a bona fide access request when said step of decrypting yields a preselected message.

37. A method carried out in a coupler, for accessing a telephone-answering system comprising the steps of:

receiving a digital message at a first port;

ascertaining whether said message corresponds to a bona fide access request;

when said step of ascertaining determines that said message corresponds to a bona fide access request, entering a message retrieval mode;

communicating prompt messages to said first port;

receiving digital response messages from said first port;

encrypting a stored message retrieved in response to said response messages to form an encrypted message; and communicating said encrypted message to said first port.

* * * * *